March 28, 1961  B. NOWAK  2,976,910
METHOD AND MATERIAL FOR RETREADING PNEUMATIC TIRE CASINGS
Filed Dec. 19, 1958  2 Sheets-Sheet 2
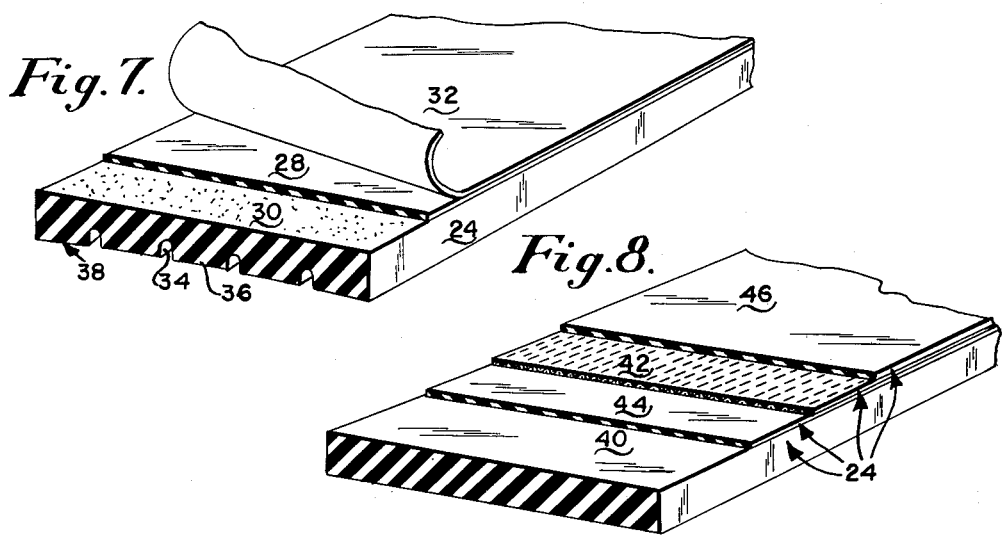
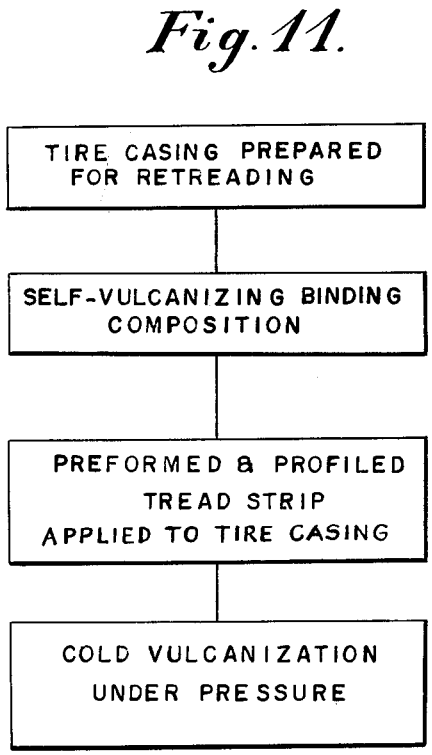
INVENTOR
BERNHARD NOWAK
BY Cushman, Darby & Cushman
ATTORNEYS

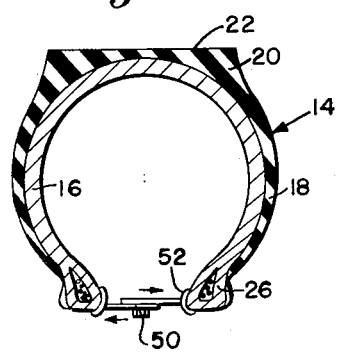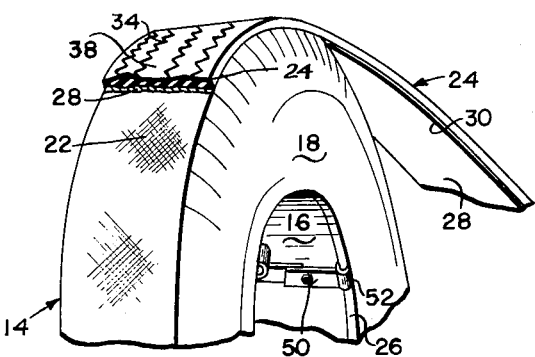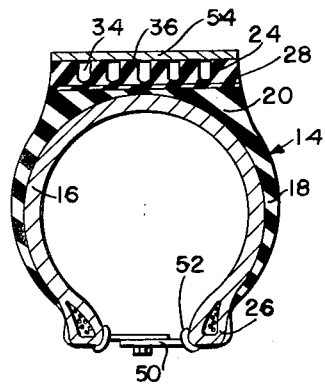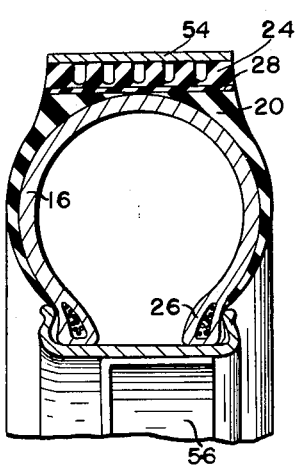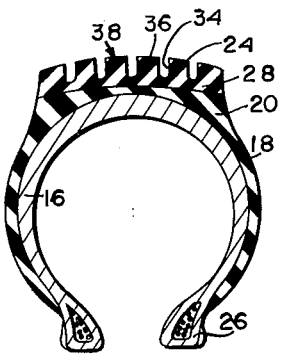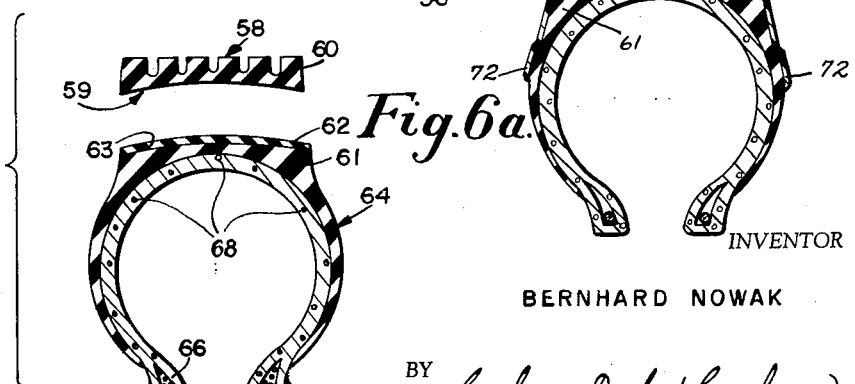

United States Patent Office 2,976,910
Patented Mar. 28, 1961

2,976,910

METHOD AND MATERIAL FOR RETREADING PNEUMATIC TIRE CASINGS

Bernhard Nowak, Bad Schlangenban, Georgenborn, Germany, assignor to Bandag Incorporated, Muscatine, Iowa, a corporation of Iowa Filed Dec. 19, 1958, Ser. No. 781,573

6 Claims. (Cl. 154—14)

This invention relates to an improved method for retreading the running surface of vehicle tires and to a pre-vulcanized tread strip which may be applied directly to a tire casing by cold vulcanization for the purpose of replacing such tread as may have been previously worn off in use or otherwise removed from the tire. This disclosure is a continuation-in-part of my copending applications, Serial No. 524,735, filed July 27, 1955; Serial No. 680,812, filed August 28, 1957, and Serial No. 680,994, filed August 29, 1957, all now abandoned.

More specifically, the present invention involves separately molding uncured tread material in a vulcanizing press under extremely high pressure and subsequently bonding the finished tread to the tire casing by a cold vulcanization reaction. The preformed vulcanized tread may be suitably profiled along the outer, road-engaging surface during the initial vulcanization of the tread material and is preferably manufactured in elongated strips of various widths so that the finished tread can be subsequently applied to tire casings of different dimensions. In accordance with this invention, the pre-vulcanized tread strip may be bonded directly to the tire without subjecting the casing to an elevated vulcanizing temperature which would tend to weaken and deteriorate the previously cured tire carcass.

Accordingly, it is a primary object of the present invention to materially increase the durability and service life of a retreaded tire by pre-vulcanizing the tread material under very high pressure until it is completely cured so that it may be separately stored in finished form for subsequent recapping operations.

Another important object of this invention resides in a method of recapping the running surface of a tire casing by utilizing a novel self-vulcanizing binding composition for permanently bonding the preformed vulcanized tread to the outer peripheral surface of the tire casing. The self-vulcanizing binding composition employed is specially compounded in order to prevent premature vulcanization of the constituents when not in use and can be applied either directly to the inner surface of the pre-vulcanized tread strip or may be formed in a separate sheet which is interposed between the roughened crown surface of the tire casing and the preformed tread strip.

A further object of the present invention has reference to a method of uniformly bonding the pre-cured tread strip to the tire casing under radial compression so that surface vulcanization therebetween will be achieved without causing any distortion of the tire casing when the special self-vulcanizing binding composition is cured during the cold vulcanization reaction.

An additional object of the present invention resides in the use of an elastic hood to prevent air from entering and becoming entrapped between the tire casing and the pre-formed tread strip while the self-vulcanizing binding composition is being cured under pressure in a sealed chamber.

A still further object of this invention is the provision of an improved method of producing a pre-vulcanized tread strip of the aforementioned type which may be structurally reinforced by metallic or cord threads embedded throughout the finished tread material.

Other objects and the entire scope of the present invention will become apparent from the detailed description given hereinafter. It should be understood, however, that the detailed description and specific examples, while indicating the preferred embodiments of the invention, are given by way of illustration only since various changes and modifications within the spirit and scope of the invention will become readily apparent as the description herein progresses. Reference being made to the accompanying drawings, which form a part hereof, wherein like numerals refer to like parts throughout and in which:

Figure 1 is a fragmentary transverse sectional view illustrating a tire casing which has been prepared and mounted for recapping;

Figure 2 is a perspective view of the mounted tire casing illustrated in Figure 1 positioned to peripherally receive a preformed vulcanized tread strip manufactured in accordance with the present invention;

Figure 3 is a transverse sectional view similar to Figure 1 illustrating an annular clamping band which has been positioned to circumferentially retain the tire casing and pre-vulcanized tread strip in assembled condition;

Figure 4 is a fragmentary transverse sectional view of the assembled unit mounted on a tire rim and inflated to radially compress the preformed tread strip against the tire casing during the cold vulcanizing reaction;

Figure 5 is a cross-sectional view of a finished tire recapped in accordance with the present invention;

Figure 6 is an exploded sectional view of a modified pre-vulcanized tread strip positioned for assembly to a structurally reinforced tire casing;

Figure 6a is a cross-sectional view of the assembled unit shown in Figure 6 including an encircling elastic hood to protect the binding layer during the vulcanizing reaction;

Figure 7 is an enlarged perspective view of a pre-vulcanized and profiled tread strip employed to retread tires;

Figure 8 is an enlarged perspective view of an uncured reinforced tread strip assembled for molding under high pressure in accordance with the present invention;

Figure 9 is a transverse sectional view of the reinforced tread strip illustrated in Figure 8 which has been vulcanized and profiled in a high pressure molding press;

Figure 10 is a transverse sectional view of a modified reinforced tread strip; and Figure 11 is a schematic diagram illustrating the various steps followed in retreading a tire casing in accordance with this invention.

Referring now to the drawings in detail, the numeral 14 generally represents a tire casing which includes the usual inner carcass 16 protected by an outer side layer 18 of rubber, and a worn or incomplete tread or crown portion 20 which has been suitably prepared along the peripheral road-engaging surface 22 to receive a strip 24 of pre-vulcanized and profiled retread material prepared in accordance with the present invention. During the recapping operation, the reinformed rim-engaging shoulders 26 of carcass 16 may be spread laterally or splayed, as shown in Figures 1–3, in order to radially reduce the circumference of the casing 14 and transversely flatten the peripheral crown surface 22 for reasons which will become readily apparent. The encircling tread strip 24 may either be manually or automatically applied to the peripheral surface 22 of the tire, after which the terminal ends thereof are roughened and coated with cement and then joined together with cushion gum.

A self-vulcanizing binding layer 28 of cushion gum is employed to permanently bond the pre-vulcanized retread material 24 to the tire casing 14 in a novel manner without permitting premature vulcanization of the uncured cushion gum until the recapping process is commenced. This is accomplished by a new self-vulcanizing binding composition which is characterized in that the components required for self-vulcanization; namely, sulphur and various vulcanizing accelerators, can be separately prepared in a stabilized condition without fear of a premature reaction until they are brought together during the recapping process. The reactive components of the self-vulcanizing binding composition employed are preferably compounded in the following manner:

Component A

| | Parts by weight |
|---|---|
| Crepe or smoked sheets | 11.0 |
| Carbon black | 2.5 |
| Sulphur | 0.7 |
| Zinc oxide | 0.7 |
| Paraffin | 0.1 |
| | 15.0 |

In addition thereto, 0.2 to 0.25 part of known age resistors (antioxidants); such as, phenyl beta naphthylamine, may also be used.

Component B

| | Parts by weight |
|---|---|
| Crepe or smoked sheets | 20 |
| Zinc oxide | 3 |
| Vulcanizing accelerators | 1 |
| | 24 |

The uncured cushion gum material used in accordance with the present invention may have the same basic composition as the cushion gum generally employed for retreading tires by hot vulcanization and may be formed in thin sheets which correspond to the width of the preformed tread strip 24 and range from 0.024 to 0.047 inch in thickness. In addition, the binding layer 28 of cushion gum may contain the composition given under component "A" while the vulcanizing accelerators, formulated in accordance with component "B," may be made into a gum solution which is diluted preferably to between four and five times the quantity by a suitable solvent; such as, benzine free from fat, benzine or trichloroethylene. The self-vulcanizing binding layer 28 of uncured cushion gum is preferably bonded to the preformed tread strip 24 by first roughening and coating the inner surface of the latter with a diluted gum solution. Next, a thin sheet or layer 28 of uncured cushion gum is applied directly to the inner surface 30 and will become locally vulcanized to the tread strip 24 by the surface reaction between the self-vulcanizing components "A" and "B." However, extremely desirable results have also been achieved by applying the self-vulcanizing binding layer of treated cushion gum directly to the heated tread strip immediately after it has been removed from the high pressure vulcanizing press so that the adjacent contacting surfaces thereof will become bonded together without requiring the use of any cement whatsoever since the retread material itself serves as an adhesive at elevated temperatures. The outer surface of the uncured cushion gum layer 28 is then covered by an easily removable protective layer 32 of impregnated paper, cellophane, or the like. The combined pre-vulcanized tread and self-vulcanizing binding layer of treated cushion gum may be commercially produced in the form of rolls which can be safely stored at normal temperatures up to 40° C. for several months without fear of a premature vulcanization reaction.

In order to carry out the retreading operation, it is only necessary to first buff and roughen the running surface 22 of the tire casing 14 and then coat it with a concentrated gum solution containing the vulcanizing accelerators, whereupon the preformed tread strip 24, which is provided with an inner self-vulcanizing layer 28 of uncured cushion gum, can be peripherally drawn on the tire after the protective layer 32 has been removed.

When the protective layer 32 has been removed to expose the self-vulcanizing layer 28 of uncured cushion gum to the special gum solution previously applied to the roughened crown surface 22 of the tire, a vulcanizing reaction will immediately take place at normal temperatures to firmly bond the preformed tread strip 24 to tire casing 14. Since this vulcanizing reaction takes place at normal or slightly elevated temperatures of from between 60° and 100° C., it is considered to be a "cold" or "self" vulcanization reaction. However, the aforementioned reaction may be accelerated by drying the retreaded tire in a warm air chamber (not shown) at a temperature of approximately 194° F. for a period of five hours or less. The cushion gum employed preferably contains about four to six percent by weight of sulphur, while the dry ingredients of the gum solution contains about three to four percent by weight of vulcanizing accelerators. Preferably, the vulcanizing accelerator will contain approximately equal proportions of the zinc salt of ethyl phenyl dithiocarbaminic acid and the cyclohexyl ethylamine salt of this acid. However, other known vulcanizing accelerators may also be employed in suitable proportions; such as, cyclohexyl ethylamine. The gum solution may be slightly modified in such a manner that the quantity of vulcanizing accelerators used is diminished or reduced to zero and replaced by sulphur. In this way a still higher resistance to premature vulcanization of the uncured binding layer 28 is obtained, but higher temperatures of between 120° and 150° C. have to be employed during the retreading process in order to complete the vulcanization reaction. When a gum solution containing no accelerator is used, component "A" may be employed as a dry ingredient.

In accordance with the present invention, the vulcanized retread strip 24 preferably is formed from caoutchouc or synthetic caoutchouc rubber which has been molded and completely cured in a vulcanizing press under an external pressure of between 300 and 1,000 pounds per square inch but preferably above 600 pounds per square inch and at a suitable vulcanizing temperature preferably between 315° and 330° F. Additionally, the retread material may be reinforced by an embedded ply 42 of cord or metallic threads, as illustrated. In Figure 8, the individual layers of a reinforced tread strip have been assembled for pre-vulcanization and generally include a thick outer cover 40 and a thin inner layer 46 of uncured rubber separated by an intermediate layer or ply 42 of reinforcing threads. A sheet 44 of cushion gum has been interposed between the outer cover 40 and reinforcing layer 42 so that the assembled layers will fuse together, when subjected to high pressure vulcanization, to form a unitary reinforced tread strip similar to the embodiment of Figure 9. While the tread material is being molded under high pressure in the vulcanizing press, a profiled tread design 34 may be formed in the outer cover layer 40 by a suitable die.

The cord or metallic steel threads utilized in the present invention for reinforcement of the retread material may be arranged and embedded either in a transverse or longitudinal direction throughout the preformed tread strip 24; the latter being preferable in order to prevent detrimental creeping of the carcass, which will occur during the normal recapping operation. Furthermore, the reinforcing threads serve to increase the load capacity of a retreaded tire so that operating tire pressure may be reduced by about 10 to 15 percent. Reinforcement of the tread strip in the aforementioned manner will additionally increase the resistance of a tire to severe carcass damage which normally would result from impact with external objects since the embedded plies of wire or cord threads will tend to distribute the localized stresses over a large area.

Alternatively, the profiled outer surface 38 of a vulcanized tread strip may be structurally reinforced by an additional ply of reinforcing cords or metallic threads 48 extending in parallel relation throughout the web portion 36 of the tread material. The reinforcing ply 48 is preferably located within the web portion 36 to enhance resistance to abrasion and increase the load capacity of the retreaded tire. It should be noted, however, that the reinforcing plies of cord or metal threads may be embedded within the pre-vulcanized tread strip in various combinations and arrangements to increase the service life of a tire retreaded in accordance with the disclosure of this invention.

Before the aforementioned pre-vulcanized and profiled tread strip 24 can be applied to a tire, the crown or road-engaging tread portion 20 of the tire casing 14 must first be circumferentially and radially contracted by laterally spreading the tire shoulders 26 with a conventional tire spreader 50. The tire spreader 50 includes a plurality of circumferentially spaced lugs 52 which exert an axial pressure along the inner portion of the tire shoulders 26, in a manner well known and which forms no part of the present invention. The road-engaging surface 22 should be roughened preferably before the tire shoulders 26 have been laterally splayed, but it should be understood that the tire casing 14 may be buffed after it has been expanded by the tire spreader 50.

When the tire casing 14 is circumferentially and radially contracted by the spreader 50 the normal transverse curvature of the road-engaging surface 22 will be substantially flattened, as illustrated in Figure 1. In order to assure a completely uniform surface vulcanization between the encircling profiled tread strip 24 and the transversely flattened crown portion 22 of the tire casing 14, an adjustable tensioning device, preferably in the form of a circular band 54, is employed to radially and circumferentially compress the assembled unit during the cold vulcanizing reaction. The adjustable tensioning device 54 must be capable of being radially contracted to an internal diameter which is considerably less than the normal inflated diameter of the road-engaging surface of the ultimately finished retreaded tire so that the preformed tread strip 24 will be uniformly compressed against the transversely flattened crown portion 20 of the casing. From the preceding description, it is readily apparent that the self-vulcanizing binding layer 28 will produce a uniform bond between the preformed tread strip 24 and the transversely flattened crown portion 20 of the tire casing, due primarily to the even distribution of radial pressure continuously applied to the assembled unit during the vulcanizing reaction.

In operation, after the crown surface 22 of the tire casing has been roughened and transversely flattened in the aforementioned manner, it is then coated with a concentrated gum solution containing suitable vulcanizing accelerators. The pre-vulcanized tread strip 24, which perferably includes a self-vulcanizing inner layer 28 of uncured cushion gum, is peripherally applied to the tire casing 14, as illustrated in Figure 2. The adjustable band 54 is then positioned to encircle the peripherally applied tread strip 24 and tightened to prevent displacement of the assembled unit, as shown in Figure 3. Spreader 50 can them be removed, after which casing 14 is placed on a suitable rim and inflated to approximately normal operating pressure. This internal pressure will cause the tread portion 20 of the tire casing 14 to uniformly expand and seat against the confined pre-vulcanized tread strip 24 since the cylindrical band 54 will continuously exert a radially constrictive force in opposition to the internal tire pressure and allow the crown portion 20 and retread strip 24 to be bonded together throughout the circumference of the tire in substantially flat transverse relation during the retreading operation. In order to accelerate vulcanization of the self-vulcanizing binding layer 28, the assembled unit may then be placed in a heated chamber and dried under a suitable temperature of less than 200° F. for a period of five hours or less. After completion of the cold vulcanization reaction, the retreaded tire is deflated and the rim dismounted. The finished tire is again placed on the tire spreader to relieve the circumferential compression of the adjustable band which is then removed allowing the tire to resume a normal position, as illustrated in Figure 5. Any overflow of the cushion gum layer 28 during vulcanization, may easily be removed from the sides of the tire so that the retread strip 24 will uniformly merge with the sides of the tire casing 14.

Referring now to Figure 6, a modified tread strip 58 is illustrated which has been increased in thickness toward the lateral marginal edges 60 thereof in order to compensate for the transverse curvature of tread portion 61. In addition, a thin sheet 62 of self-vulcanizing cushion gum has been separately applied to the transversely curved peripheral surface 63 of tread portion 61, rather than being secured to the inner surface of the preformed tread strip, as previously described.

The modified tread strip 58 is especially suitable for use with a tire casing which has been structurally reinforced by an embedded ply of metallic threads 68 to resist any lateral flexure. In this situation, the reinforced casing 64 would tend to resist any lateral spreading of the tire shoulders 66 and therefore could not be radially and circumferentially contracted to a substantially flat transverse contour. Since the marginal edges 60 of the preformed tread have been increased in thickness to define a transversely curved inner surface 59 complementary in contour to the peripheral surface 63 of casing 64, the modified tread strip 58 can be peripherally applied without spreading the tire shoulders 66.

Rather than using an adjustable annular band to apply a uniform radial pressure, the assembled unit may be placed in a sealed pressurized autoclave or chamber (not shown) and subjected to a fluid pressure of between 4 to 10 atmospheres during the vulcanization reaction. The pressurized chamber will tend to radially compress the transversely curved inner tread surface 59 against the complementary curved peripheral surface 63 of the tire casing 64 to achieve uniform surface vulcanization of the intermediate binding layer 62. In addition, the pressurized chamber may be warmed to a slightly elevated temperature in order to provide a drying operation that will accelerate cold vulcanization. This modified process will permit semi-full capping of a worn casing which, until now has not been possible.

An annular elastic hood or mold 70 constructed from plastic, rubber or similar resilient material can be employed to prevent air from entering and becoming entrapped between the assembled casing 64 and tread strip 58 while the binding layer 62 of cushion gum is being cured under pressure in the sealed chamber. The encircling elastic hood 70 includes a pair of flexible side wall members 72 which extend downwardly beyond the lateral edges 60 of the tread strip 58 in resilient engagement with the outer side walls of the tire casing 64 to form a continuous air seal therebetwen, as illustrated in Figure 6a. In addition, the elastic hood will also exert a uniform radial tension against the assembled unit, and in this manner will prevent distortion of the tire casing during the vulcanizing reaction.

Tires retreaded in accordance to the present invention have withstood road wear far exceeding the normal service life of a tire recapped by any of the other well known hot vulcanization methods. This is principally due to the fact that the pre-vulcanized and profiled tread strip is separately molded in a vulcanizing press under a minimum pressure of at least 300 pounds per square inch but preferably at approximately 650 pounds per square inch. This unusually high pressure serves to produce a finished tread of enhanced strength and hardness which will tend to resist normal road abrasion and accordingly increase the service life of the retreaded tire.

It is also to be understood that, although several preferred embodiments of the invention have been shown in the drawings and described with considerable particularity in the foregoing specification, the invention is not limited to the specific details of construction, shown and described, but includes all modifications coming within the scope of the appended claims and their equivalents.

I claim:

1. A method for retreading the road engaging surface of a rubber tire comprising preforming a tread strip from rubber material by completely vulcanizing said material under a molding pressure of at least about 300 pounds per square inch, peripherally applying said preformed tread strip to said road engaging surface, interposing betweend said road engaging surface and said preformed tread strip a bonding medium capable of vulcanizing at temperatures below about 150° C., said bonding medium comprising a binding composition including at least two components that are normally in a stabilized condition and that must be kept apart until just prior to use for preventing premature vulcanization thereof, uniting the terminal ends of said preformed tread strip to form a retread tire assembly, and subjecting said retreaded tire assembly to an external pressure of at least normal tire operating pressure, and an elevated drying temperature below about 150° C. in order to accelerate the vulcanizing reaction of said binding composition and obtain a uniform bond between said road engaging surface and said preformed tread strip.

2. The method of claim 1 wherein said binding composition comprises a thin layer of uncured cushion gum containing approximately 4 to 6 percent by weight of sulphur, and a vulcanizing solution including a solvent selected from the group consisting of benzene and trichloroethylene containing 3 to 4 percent by dry weight of a suitable vulcanizing accelerator.

3. The method of claim 1 wherein the production of said preformed tread strip includes the step of embedding a plurality of metallic threads in said rubber material to reinforce said tread strip.

4. A method for retreading the road engaging surface of a pneumatic tire casing comprising preforming a tread strip from rubber material by completely vulcanizing said material under a molding pressure of between 300 and 1000 pounds per square inch, bonding a thin layer of uncured cushion gum to the inner surface of said tread strip, buffing said road engaging surface to roughen the same, coating said roughened surface with a gum solution containing a vulcanizing accelerator, peripherally applying said preformed tread strip to said coated surface with the layer of uncured cushion gum interposed therebetween, joining together the terminal ends of said tread strip to form a retreaded tire assembly, radially compressing said cushion gum between the road engaging surface of said casing and the inner surface of said tread strip under a pressure of between normal tire operating pressure and about 147 pounds per square inch to obtain a uniform circumferential bond therebetween, and subjecting the radially compressed retreaded tire assembly to an elevated drying temperature below 150° C. for a period of up to five hours to accelerate the self-vulcanizing reaction of said cushion gum and gum solution.

5. The method of claim 4 wherein said radial pressure is uniformly applied by first peripherally enclosing the retreaded tire assembly strip with a circumferentially constrictive band and then inflating said casing to substantially normal tire operating pressure in order to compress said cushion gum between the radially expanded road-engaging surface of said tire casing and the radially confined tread strip to obtain a uniform circumferential bond therebetween.

6. The method of claim 4 wherein said radial pressure is uniformly applied by first peripherally enclosing the retreaded tire assembly in a radially constrictive resilient mold and then placing the same in a closed chamber which is maintained under a pressure of between 4 to 10 atmospheres and a temperature below 150° C.

References Cited in the file of this patent

UNITED STATES PATENTS

| | | |
|---|---|---|
| 1,083,231 | Wale | Dec. 30, 1913 |
| 1,352,164 | Yelm | Sept. 7, 1920 |
| 1,509,301 | Kearns | Sept. 23, 1924 |
| 1,530,009 | Neal | Mar. 17, 1925 |
| 1,553,438 | Gauntt | Sept. 15, 1925 |
| 1,652,726 | Mook | Dec. 13, 1927 |
| 1,707,014 | Hopkinson | Mar. 26, 1929 |
| 1,960,137 | Brown | May 22, 1934 |
| 1,979,691 | Jackson | Nov. 6, 1934 |
| 2,232,001 | Hawkinson | Feb. 18, 1941 |
| 2,282,580 | Hawkinson | May 12, 1942 |
| 2,292,286 | Owen | Aug. 4, 1942 |
| 2,297,354 | Hawkinson | Sept. 29, 1942 |
| 2,405,943 | Doering et al. | Aug. 20, 1946 |
| 2,474,013 | Rawls | June 21, 1949 |
| 2,638,955 | Gruber | May 19, 1953 |
| 2,682,082 | Gehman | June 29, 1954 |
| 2,689,200 | Johnson | Sept. 14, 1954 |
| 2,697,472 | Hawkinson | Dec. 21, 1954 |
| 2,803,283 | Gruber | Aug. 20, 1957 |
| 2,855,014 | Gruber | Oct. 7, 1958 |

FOREIGN PATENTS

| | | |
|---|---|---|
| 130,440 | Great Britain | Jan. 25, 1919 |